(12) United States Patent
Wan

(10) Patent No.: US 10,794,786 B2
(45) Date of Patent: Oct. 6, 2020

(54) MINIATURE SIZE FORCE SENSOR WITH BUBBLE DETECTION CAPABILITIES

(71) Applicant: Honeywell International Inc., Morris Plains, NJ (US)

(72) Inventor: Yongbo Wan, Dublin, OH (US)

(73) Assignee: Honeywell International Inc., Charlotte, NC (US)

( * ) Notice: Subject to any disclaimer, the term of this patent is extended or adjusted under 35 U.S.C. 154(b) by 200 days.

(21) Appl. No.: 16/139,187

(22) Filed: Sep. 24, 2018

(65) Prior Publication Data

US 2020/0096405 A1    Mar. 26, 2020

(51) Int. Cl.
| | | |
|---|---|---|
| *G01L 19/00* | (2006.01) | |
| *G01L 19/14* | (2006.01) | |
| *G01N 21/01* | (2006.01) | |
| *G01N 21/85* | (2006.01) | |
| *G01F 23/28* | (2006.01) | |
| *G01F 23/284* | (2006.01) | |
| *G01F 23/22* | (2006.01) | |
| *G01F 23/292* | (2006.01) | |
| *G01F 1/74* | (2006.01) | |

(52) U.S. Cl.
CPC ........ *G01L 19/0092* (2013.01); *G01L 19/143* (2013.01); *G01N 21/01* (2013.01); *G01N 21/85* (2013.01); *G01F 1/74* (2013.01); *G01F 23/22* (2013.01); *G01F 23/28* (2013.01); *G01F 23/284* (2013.01); *G01F 23/292* (2013.01)

(58) Field of Classification Search
CPC . G01F 1/74; G01F 23/22; G01F 23/28; G01F 23/292; G01F 23/284; G01L 19/0092; G01L 19/143; G01L 1/18; G01L 1/26; G01N 21/01; G01N 21/85
See application file for complete search history.

(56) References Cited

U.S. PATENT DOCUMENTS

| | | |
|---|---|---|
| 6,531,708 B1 | 3/2003 | Malmstrom et al. |
| 7,121,143 B2 | 10/2006 | Malmstrom et al. |
| 7,249,522 B2 | 7/2007 | Kirchdoerffer et al. |
| 8,770,010 B1 | 7/2014 | Shapiro |

(Continued)

OTHER PUBLICATIONS

U.S. Appl. No. 16/041,467, unpublished (filed Jul. 20, 2018), Sudheer Beligere Sreeramu (Inventor), Honeywell International Inc. (Assignee), 50 pages.

(Continued)

*Primary Examiner* — Jonathan M Dunlap
(74) *Attorney, Agent, or Firm* — Alston & Bird LLP

(57) ABSTRACT

A photosensitive force sensor is provided. An example photosensitive force sensor comprises a force sensing device configured to be disposed on a surface of a substrate; a housing configured to be disposed on at least a portion of the surface of the substrate; and an actuator configured to be disposed partially within the housing and partially within the aperture defined by the housing. The housing is configured to enclose the force sensing device. The aperture is configured to provide a coupling interface. The actuator is in mechanical contact with the force sensing device. The actuator is a rigid body that is configured to provide a light path from a light source external to/outside of the housing to the force sensing device.

20 Claims, 11 Drawing Sheets

(56) References Cited

U.S. PATENT DOCUMENTS

| | | | |
|---|---|---|---|
| 2007/0251328 A1* | 11/2007 | Selvan | G01L 1/18 |
| | | | 73/777 |
| 2013/0247689 A1 | 9/2013 | Thanigachalam et al. | |
| 2015/0049330 A1 | 2/2015 | Aliane et al. | |
| 2018/0180494 A1 | 6/2018 | Speldrich et al. | |
| 2020/0025634 A1* | 1/2020 | Sreeramu | G01L 1/20 |

OTHER PUBLICATIONS

Communication pursuant to Rules 70(2) and 70a(2) for European Application No. 19199070.4, dated Mar. 30, 2020, 2 pages.
Extended European Search Report for Application No. 19199070.4, dated Feb. 21, 2020, 8 pages.

* cited by examiner

| PIN NO. | ELECTRICAL FUNCTION I2C | ELECTRICAL FUNCTION SPI | ELECTRICAL SPECIFICATION ANALOG [mV] |
|---|---|---|---|
| 100a | VS (POWER SUPPLY) | VS | VS |
| 100b | SS (SLAVE SELECT) | SS | Vout + |
| 100c | GND (GROUND) | GND | GND |
| 100d | SCL (SERIAL CLOCK) | SCLK | Vout - |
| 100e | SDA (SERIAL DATA) | MOSI (MASTER OUT SLAVE IN) | NC |
| 100f | NC (NO CONNECTION) | MISO (MASTER IN SLAVE OUT) | NC |

FIG. 2C

MINIATURE SIZE FORCE SENSOR WITH BUBBLE DETECTION CAPABILITIES

TECHNOLOGICAL FIELD

Example embodiments of the present disclosure relate generally to sensors and, more particularly, to force sensors with bubble detection capabilities.

BACKGROUND

Industrial and commercial applications, including industrial and medical equipment, are increasingly utilizing force sensors to determine applied forces. In an example scenario, a force sensor may be coupled to a float line for detecting occlusion or blockage within the line. It may also be preferable to monitor the line for bubbles within a fluid inside the tube. Thus, an ultrasonic sensor or other additional sensor may also be positioned so as the monitor the fluid within the line for bubbles.

Applicant has identified a number of deficiencies and problems associated with conventional force sensors. Through applied effort, ingenuity, and innovation, many of these identified problems have been solved by developing solutions that are included in embodiments of the present disclosure, many examples of which are described in detail herein.

SUMMARY

Systems and apparatuses are disclosed herein for providing a miniature size force sensor package with bubble detection capabilities and methods for using such sensor packages for detecting bubbles and/or inconsistencies in the fluid within a tube or line coupled to the miniature size force sensor package. In some embodiments, the miniature size force sensor package provided herein solves the above problems by providing a single sensor that can monitor a tube for occlusion and/or blockage and for bubbles within a fluid in the tube simultaneously.

According to a first aspect of the present invention, a photosensitive force sensor is provided. In an example embodiment, the photosensitive force sensor comprises a force sensing device configured to be disposed on a surface of a substrate; a housing configured to be disposed on at least a portion of the surface of the substrate; and an actuator configured to be disposed partially within the housing and partially within an aperture defined by the housing. The housing is configured to enclose the force sensing device. The aperture is configured to provide a coupling interface. The actuator is in mechanical contact with the force sensing device. The actuator is a rigid body that is configured to provide a light path from a light source external to the housing to the force sensing device.

In an example embodiment, the force sensing device is photosensitive.

In an example embodiment, the force sensing device comprises at least one of a piezoresistive force sensing device and a microelectromechanical systems (MEMS) force sensing device.

In an example embodiment, a center of the aperture is configured to align with a center of the force sensing device.

In an example embodiment, the actuator is (a) translucent or at least partially transparent and (b) at least one of (i) an at least semi-spherical ball or (ii) a lens.

In an example embodiment, the force sensing device is configured to provide at least one output signal indicating (a) a mechanical force applied to the force sensing device and (b) a light signature incident upon the force sensing device.

According to another aspect of the present invention, a system for monitoring a tube for blockage and for the presence of bubbles within a fluid contained within the tube is provided. In an example embodiment, the system comprises a force sensing device configured to be disposed on a surface of a substrate; a housing configured to be disposed on at least a portion of the surface of the substrate; an actuator configured to be disposed partially within the housing and partially within an aperture defined by the housing; and a light source configured to illuminate the fluid contained within the tube. The housing is configured to enclose the force sensing device. The aperture is configured to provide a coupling interface and the coupling interface is configured to be coupled to an end of the tube. The actuator is in mechanical contact with the force sensing device. The actuator is a rigid body that is configured to provide a light path from the fluid contained within the tube to the force sensing device.

In an example embodiment, the force sensing device is photosensitive.

In an example embodiment, the force sensing device comprises at least one of a piezoresistive force sensing device and a microelectromechanical systems (MEMS) force sensing device.

In an example embodiment, a center of the aperture is configured to align with a center of the force sensing device.

In an example embodiment, the actuator is (a) translucent or at least partially transparent and (b) at least one of (i) an at least semi-spherical ball or (ii) a lens.

In an example embodiment, the tube is a float line coupled to a pump.

In an example embodiment, the force sensing device is configured to provide at least one output signal indicating (a) a mechanical force applied to the force sensing device and (b) a light signature incident upon the force sensing device.

According to yet another aspect of the present invention, a method for monitoring fluid contained within a tube for the presence of bubbles is provided. In an example embodiment, the method comprises processing an output signal of a force sensing device to determine whether the output signal satisfies a light signature threshold requirement. The force sensing device is an element of a force sensor package. The force sensor package comprises the force sensing device configured to be disposed on a surface of a substrate; a housing configured to be disposed on at least a portion of the surface of the substrate; and an actuator configured to be disposed partially within the housing and partially within an aperture defined by the housing. The housing is configured to enclose the force sensing device. The aperture is configured to provide a coupling interface. The actuator is in mechanical contact with the force sensing device. The actuator is a rigid body that is configured to provide a light path from a light source external to the housing to the force sensing device.

In an example embodiment, (a) an end of the tube is coupled to the coupling interface, (b) a light source illuminates the fluid contained within the tube, and (c) the light source external to the housing comprises the light source.

In an example embodiment, the method further comprises responsive to determining that the output signal satisfies the light signature threshold requirement causing a bubble alert to be provided.

In an example embodiment, the method further comprises processing the output signal or a first output signal to determine whether a mechanical force applied to the force sensing device satisfies a mechanical force threshold requirement. In an example embodiment, the method further comprises responsive to determining that the output signal or the first output signal satisfies the mechanical force threshold requirement causing a blockage alert to be provided.

In an example embodiment, (a) the force sensor package further comprises a signal conditioning circuitry configured to be electrically coupled to the force sensing device, (b) the housing is further configured to enclose the signal conditioning circuitry, and (c) the processing of the at least one output signal is performed at least in part by the signal conditioning circuitry.

In an example embodiment, the actuator is (a) translucent or at least partially transparent and (b) at least one of (i) an at least semi-spherical ball or (ii) a lens.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

FIG. 2C shows a table illustrating electrical function of one or more electrical contact pads, in accordance with some example embodiments described herein.

DETAILED DESCRIPTION

Figure 1A:
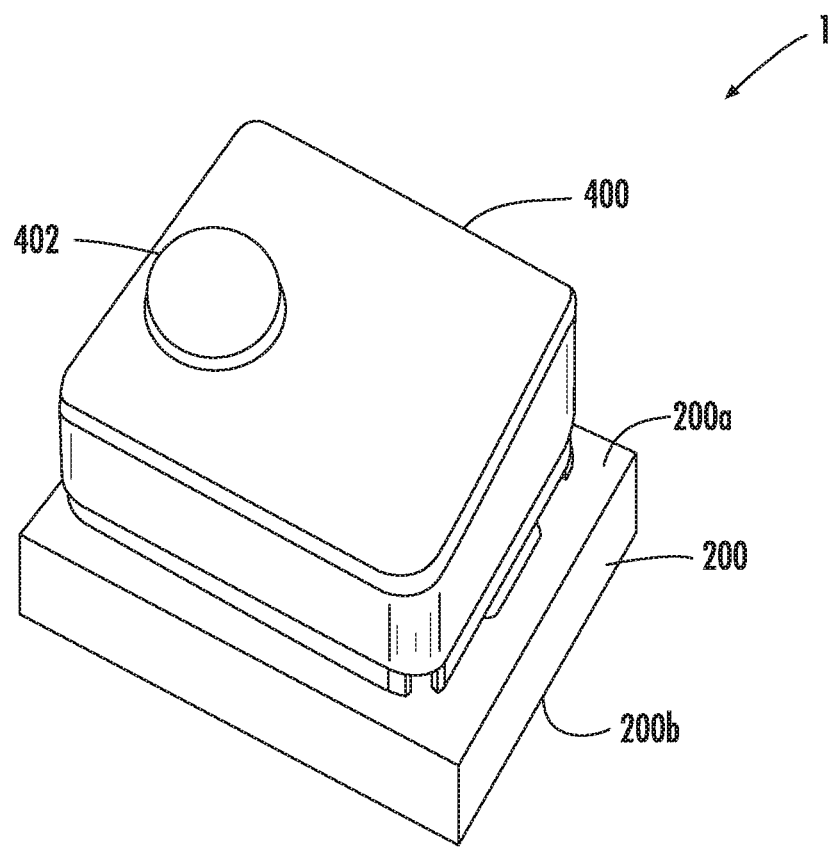
FIG. 1A shows an example top view of a force sensor package, in accordance with some example embodiments described herein.

The following description should be read with reference to the drawings wherein like reference numerals indicate like elements throughout the several views. The detailed description and drawings show several embodiments which are meant to be illustrative of the disclosure. It should be understood that any numbering of disclosed features (e.g., first, second, etc.) and/or directional terms used in conjunction with disclosed features (e.g., front, back, under, above, etc.) are relative terms indicating illustrative relationships between the pertinent features.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The word "example," when used herein, is intended to mean "serving as an example, instance, or illustration." Any implementation described herein as an "example" is not necessarily preferred or advantageous over other implementations. As used herein, the term "approximately" refers to within manufacturing and/or engineering specifications.

Overview

Force sensors are used in a variety of applications such as, but not limited to, infusion pumps, ambulatory non-invasive pumps, occlusion detection, enteral pumps, load and compression sensing, variable tension control, and other application areas. Further, there is a continuous push from the market for reduction in size of the force sensors. Users in certain applications may need a force sensor which is small enough to fit into an application area and simultaneously provides an interface which is large enough for deployment.

Moreover, in various scenarios it is important to monitor fluid carrying tubes (e.g., connected to pumps) for occlusion but also for bubbles within the fluid inside the tube. Generally, an additional sensor, such as an ultrasonic sensor, is added to monitor for bubbles within fluid inside the tube. This requires an additional sensor to be fit into the application area.

Various embodiments provide a sensor that may be used as a force sensor that may be used to monitoring a tube for occlusion and/or blockage and monitor fluid within the tube for bubbles. In an example embodiment, the sensor is a miniature sized force sensor with bubble detection capabilities. For example, various components of the sensor may be similar to those described in U.S. application Ser. No. 16/041,467, filed Jul.

20, 2018, the content of which is hereby incorporated by reference herein in its entirety.

Example embodiments described herein provide systems, apparatuses, and methods for a force sensor package with bubble detection capabilities and methods for using such sensor packages for detecting bubbles and/or inconsistencies in the fluid within a tube or line coupled to the force sensor package. Thus, the force sensor package allows for the efficient monitoring of a tube for occlusion and/or blockage and monitoring the fluid inside the tube for bubbles and/or inconsistencies using a single sensor package.

In general, disclosed embodiments of the force sensor package comprise a force sensor for sensing a force applied by an external source. The force sensor may comprise a substrate comprising a first surface and a second surface opposite the first surface. The substrate may comprise a plurality of electrical contact pads disposed on the first surface of the substrate. The force sensor may comprise a force sensing device disposed on the second surface of the substrate. The force sensing device is photosensitive. The force sensor may further comprise a housing disposed on at least a portion of the second surface of the substrate. The housing may enclose at least the force sensing device. The housing may define an aperture which provides a coupling interface. The coupling interface further provides a path for the force to be transferred to the force sensing device. The coupling interface further provides a light path for light traveling through the fluid within the tube to reach the force sensing device. For example, the coupling interface is configured to have an actuator disposed therein. In various embodiments, the actuator may be a translucent or transparent rigid object disposed within the aperture. For example, the actuator may be a glass or translucent polymeric ball or marble, a lens, and/or the like. For example, the actuator may be configured to transfer mechanical force to the force sensing device and providing a light path to the force sensing device. In an example embodiment, the actuator may be configured to focus electromagnetic energy and/or light passing there-through onto the force sensing device and/or a photosensitive layer/film of the force sensing device.

Figure 1B:
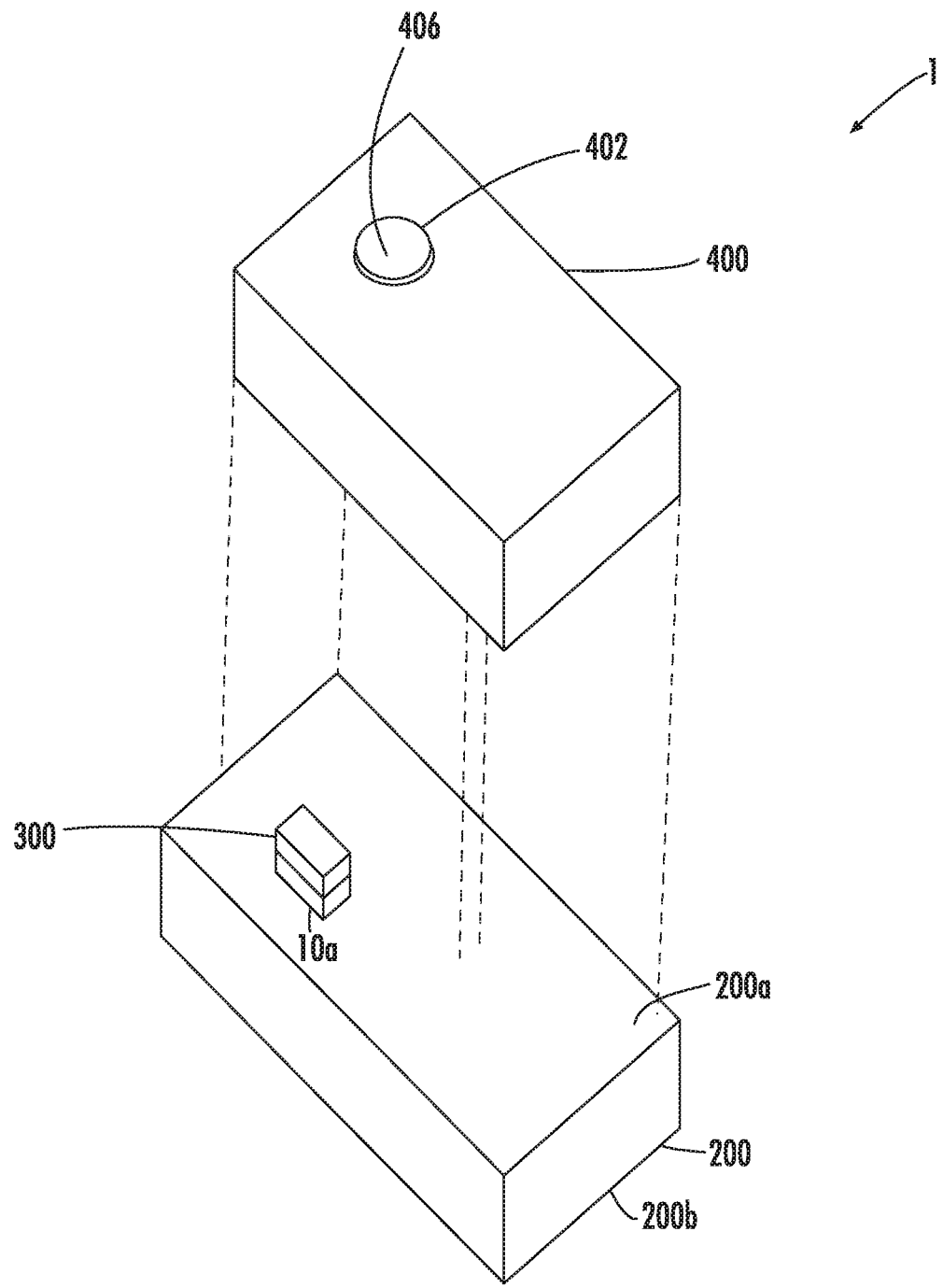
FIG. 1B shows an example exploded view of a force sensor package, in accordance with some example embodiments described herein.

Referring to FIG. 1A and FIG. 1B, an example embodiment of a force sensor package 1 is described. FIG. 1A shows an example top view of the force sensor package 1, in accordance with some example embodiments described herein. FIG. 1B shows an example exploded view of the force sensor package 1, in accordance with some example embodiments described herein. As shown in FIG. 1A and FIG. 1B, the force sensor package 1 comprises a force sensor substrate 200 and a housing 400 defining an aperture 402. The force sensor substrate 200 comprises a top side 200a and a bottom side 200b opposite the top side 200a. The force sensor substrate 200 further comprises one or more electrical contact pads (not shown) disposed on the bottom side 200b of the force sensor substrate 200.

As shown in FIG. 1B, a force sensing device 300 is disposed on the top side 200a of the force sensor substrate 200. As shown in FIG. 1B, the force sensing device 300 is mounted on the top side 200a of the force sensor substrate 200 via an adhesive 10a. The housing 400 is disposed on the top side 200a of the force sensor substrate 200. As shown in FIG. 1B, the housing 400 encloses the force sensing device 300. As shown in FIG. 1A and FIG. 1B, the housing 400 further defines an aperture 402. The housing 400 is mounted on the top side 200a of the force sensor substrate 200 such that the aperture 402 aligns with the force sensing device 300. For example, a center of the aperture 402 may be configured to align with a center of the force sensing device 300. The aperture 402 provides a coupling interface 406 configured for having an actuator disposed within the aperture 402 and configured for coupling a tube and/or fluid within the tube to the force sensing device 300. The coupling interface 406 provides a common path for a mechanical force and/or light to be transmitted to the force sensing device 300 through the aperture 402 and via the actuator disposed within the aperture 402.

Figure 1C:
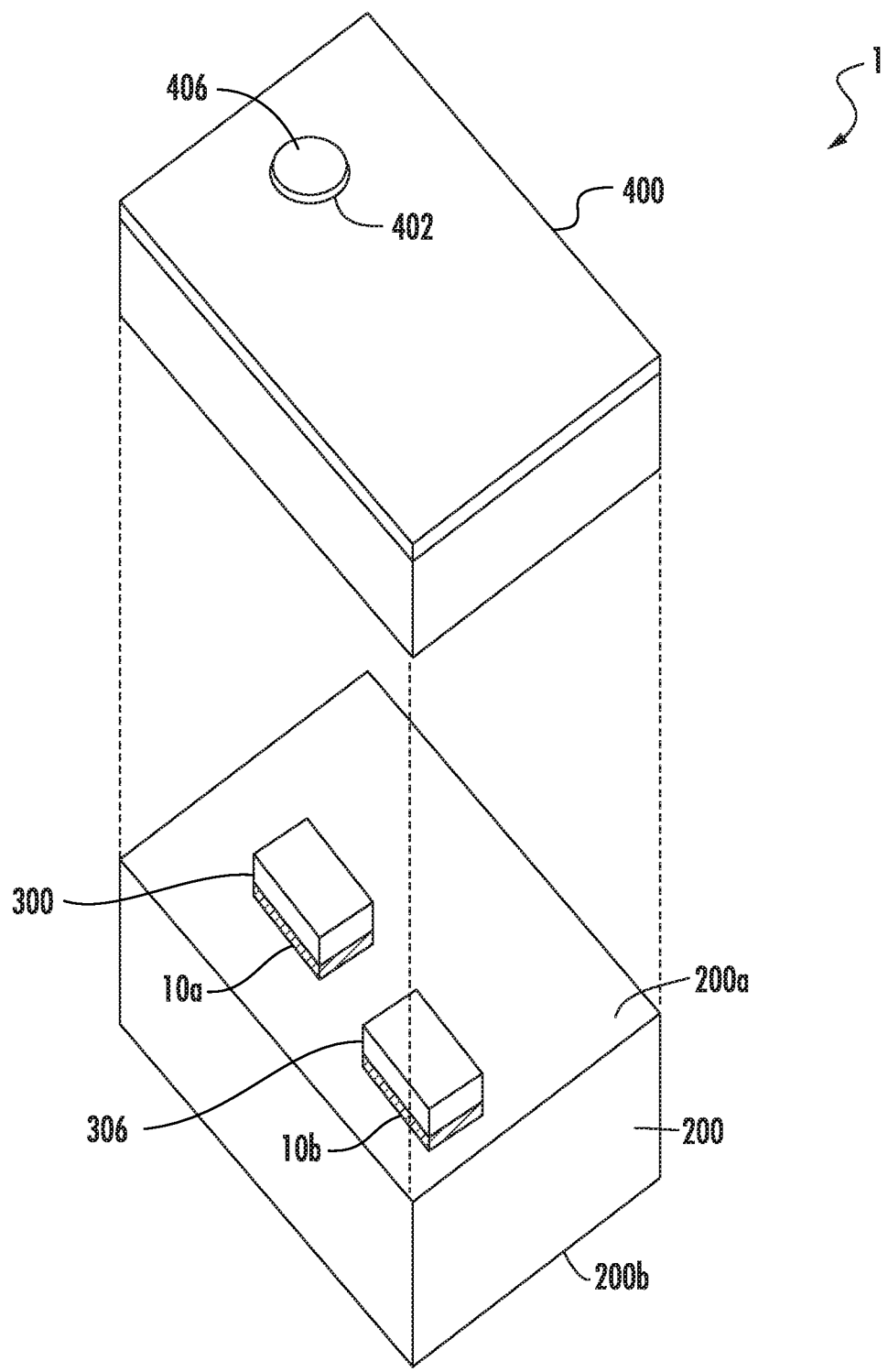
FIG. 1C shows another example exploded view of a force sensor package, in accordance with some example embodiments described herein.

Referring to FIG. 1C, in conjunction with FIG. 1A and FIG. 1B, another example embodiment of the force sensor package 1 described above is illustrated. FIG. 1C shows another example exploded view of the force sensor package 1, in accordance with some example embodiments described herein. As shown in FIG. 1C, an optional signal conditioning circuitry 306 is disposed on the top side 200a of the force sensor substrate 200 in addition to the force sensing device 300. The optional signal conditioning circuitry 306 is electrically coupled to the force sensing device 300 via one or more wire bonds (not shown). As shown in FIG. 1C, the housing 400 is disposed on the top side 200a of the force sensor substrate 200 such that the housing 400 encloses the force sensing device 300 and the optional signal conditioning circuitry 306. The housing 400 is mounted on the top side 200a of the force sensor substrate 200 such that the aperture 402 aligns with the force sensing device 300 (similar to FIGS. 1A and 1B). For example, the center of the aperture 402 may be configured to align with the center of the force sensing device 300. The aperture 402 provides a coupling interface 406 (similar to FIGS. 1A and 1B). The coupling interface 406 provides the path for the force to be transmitted to the force sensing device 300 and for light transmitting through the fluid within a tube coupled to the force sensing package 1 to reach the force sensing device 300 (e.g., via the actuator). In some embodiments, the force sensor package 1 may not include optional signal conditioning circuitry 306. In such embodiments, the force sensing device 300 may output an analog voltage linearly proportional to the applied force (e.g., as described below with reference to FIG. 2C).

Having described various example embodiments at a high level, the designs of the various devices performing various example operations is provided below.

Figure 2A:
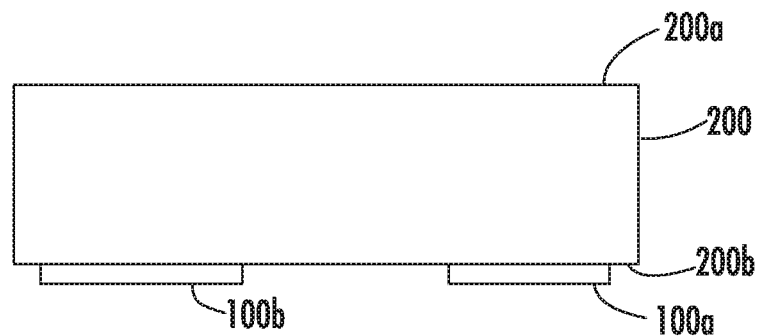
FIG. 2A illustrates a cross-sectional view of a force sensor substrate, in accordance with some example embodiments described herein.
Figure 2B:
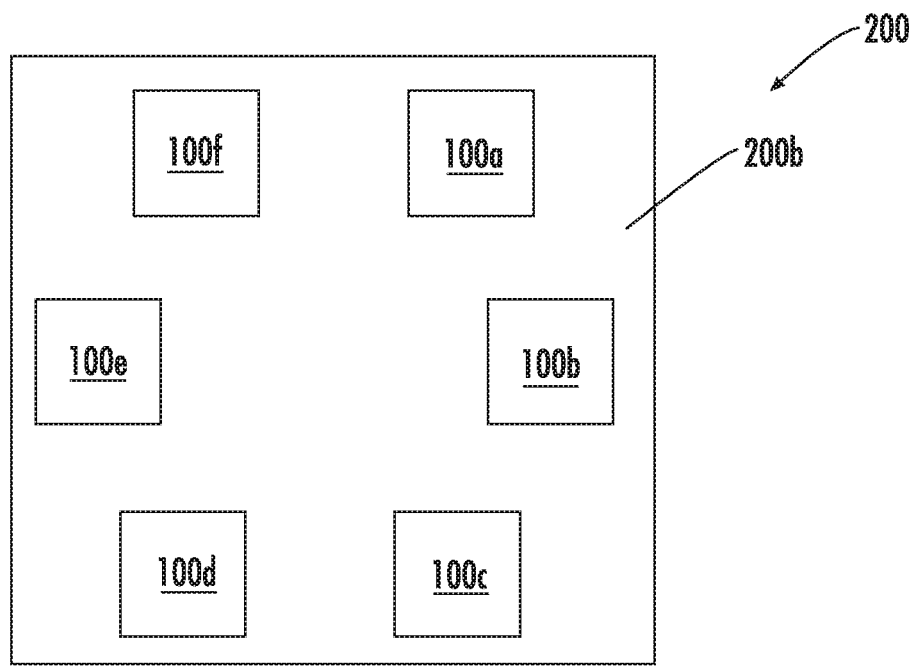
FIG. 2B illustrates a bottom view of a force sensor substrate, in accordance with some example embodiments described herein.

Referring to FIG. 2A and FIG. 2B, an example embodiment of the force sensor substrate 200 (mentioned above in FIGS. 1A-1C) is described. FIG. 2A illustrates a cross-sectional view of the force sensor substrate 200, in accordance with some example embodiments described herein. FIG. 2B illustrates a bottom view of the force sensor substrate 200, in accordance with some example embodiments described herein.

As shown in FIG. 2A, the force sensor substrate 200 comprises the top side 200a and the bottom side 200b. The force sensor substrate 200 further comprises one or more electrical contact pads disposed on the bottom side 200b of the force sensor substrate 200. FIG. 2B shows the one or more electrical contact pads, such as, but not limited to, six electrical contact pads (e.g. 100a, 100b, 100c, 100d, 100e, 100f) disposed on the bottom side 200b of the force sensor substrate 200. In some context, the one or more electrical contact pads may also be referred as bond pads.

In general, the force sensor substrate 200 provides a surface such as the bottom side 200b on which the one or more electrical contact pads, such as six electrical contact pads (e.g. 100a, 100b, 100c, 100d, 100e, 100f), can be disposed. The one or more electrical contact pads are configured to provide an electrical connection with an external circuitry (not shown). The one or more electrical contact pads may be disposed along, but not limited to, a row, a column or a diagonal of the force sensor substrate 200.

In some embodiments, the force sensor substrate 200 comprises a printed circuit board (PCB). In other embodiments, the force sensor substrate 200 may comprise any suitable material, such as, but not limited to, a dielectric material, an insulating material, or any combination thereof. In one example embodiment, the force sensor substrate 200 may be a polygon in planar shape, such as, but not limited to, square, rectangle, triangle, pentagon, or any other suitable shape. In another example embodiment, the force sensor substrate 200 may be a non-polygon in planar shape.

In some embodiments, the force sensor substrate 200 is approximately 1.65 millimeters (mm)×1.65 mm in planar size. In other embodiments, the force sensor substrate 200 may have other suitable dimensions. In one example embodiment, the force sensor substrate 200 is approximately 200 micrometers (microns) thick. In another example embodiment, the thickness of the force sensor substrate 200 may be approximately 300 microns, 400 microns, or any other suitable thickness.

The electrical contact pads (100a, 100b, 100c, 100d, 100e, 100f), as shown in FIG. 2B may correspond to metallic pads comprising one or more metals, for example, copper (Cu), silver (Ag), gold (Au), aluminum (Al), or a combination thereof. In one example embodiment, the electrical contact pads (100a, 100b, 100c, 100d, 100e, 100f) may be surface mounted on the bottom side 200b of the force sensor substrate 200 using surface mount technology (SMT). In another example embodiment, the electrical contact pads (100a, 100b, 100c, 100d, 100e, 100f) may be chemically disposed on the bottom side 200b of the force sensor substrate 200 using a chemical process, such as, but not limited to, using a metal plating solution (such as copper plating solution) to deposit the metal on the bottom side 200b of the force sensor substrate 200 to form the electrical contact pads (100a, 100b, 100c, 100d, 100e, 100f). In yet another example embodiment, the electrical contact pads (100a, 100b, 100c, 100d, 100e, 100f) may be disposed through a process of etching on the bottom side 200b of the force sensor substrate 200.

In some embodiments, the electrical contact pads (100a, 100b, 100c, 100d, 100e, 100f) may be a polygon in planar shape, for example, triangle, rectangle, square, pentagon, hexagon, or any other suitable shape. In other embodiments, the electrical contact pads (100a, 100b, 100c, 100d, 100e, 100f) may be a non-polygon in planar shape.

It should be appreciated that, the six electrical contact pads (100a, 100b, 100c, 100d, 100e, 100f) shown in FIG. 2B are only one example of the one or more electrical contact pads, and it is contemplated that there can be more than more than six electrical contact pads. For example, the one or more electrical contact pads may comprise eight or ten electrical contact pads.

In some embodiments, the electrical contact pads (100a, 100b, 100c, 100d, 100e, 100f) is approximately 1.30 mm×1.00 mm in planar size. In other embodiments, the electrical contact pads (100a, 100b, 100c, 100d, 100e, 100f) may comprise any suitable planar size, such as, but not limited to approximately 1.23 mm×0.95 mm, 1.35 mm×1.05 mm, 1.58 mm×0.75 mm, 1.63 mm×0.80 mm, 1.68 mm×0.85 mm, or any other suitable planar size.

As described above, the electrical contact pads (100a, 100b, 100c, 100d, 100e, 100f) are configured to provide an electrical connection with an external circuitry. The electrical contact pads (100a, 100b, 100c, 100d, 100e, 100f) use a communication protocol such as, but not limited to, Inter-Integrated Circuit (I2C) protocol or Serial Peripheral Interface (SPI) protocol to communicate with the external circuitry, and provide the electrical connection with the external circuitry. FIG. 2C shows a table illustrating the electrical function of each of the electrical contact pads (100a, 100b, 100c, 100d, 100e, 100f) according to the I2C and SPI protocols supported by the electrical contact pads (100a, 100b, 100c, 100d, 100e, 100f) in accordance with some example embodiments described herein. The table shown in FIG. 2C further illustrates the electrical specification of each of the electrical contact pads (100a, 100b, 100c, 100d, 100e, 100f) according to the unamplified analog output of the electrical contact pads (100a, 100b, 100c, 100d, 100e, 100f) in accordance with some example embodiments described herein. For example, in some embodiments the electrical contact pads (100a, 100b, 100c, 100d, 100e, 100f) may output unamplified bridge only output [mV] comprising non-signal-conditioned electrical output measured directly from the force sensing device through the electrical contact pads. It should be appreciated that the electrical contact pads layout configuration illustrated in the table of FIG. 2C is an example, it can be contemplated that other configurations of the one or more electrical contact pads layout are possible. Further, the communication protocols I2C and SPI protocols are examples of the communication protocols, other protocols for the communication may be used.

In various embodiments, electrical circuitry may be provided that is dedicated to transmitting and/or processing electrical signals from the force sensing device 300 regarding a pressure applied to the force sensing device 300 via the actuator through the coupling interface 406 provided by the aperture 402 and electrical signals from the force sensing device 300 regarding light incident on the force sensing device through the actuator.

Figure 3A:
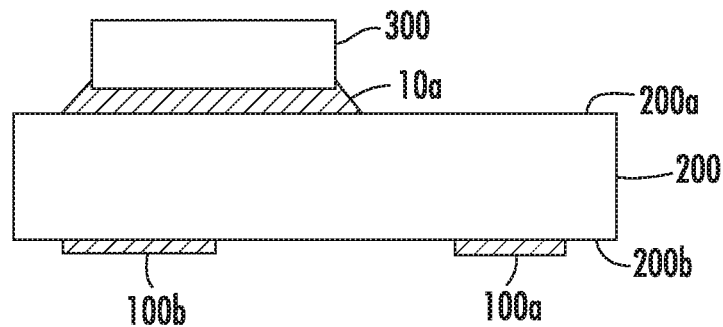
FIG. 3A illustrates a cross-sectional view a force sensing device disposed on a force sensor substrate, in accordance with some example embodiments described herein.

Referring now to FIG. 3A, in conjunction with the FIG. 1 and FIG. 2, an example embodiment of the force sensing device 300 disposed on the force sensor substrate 200 is described. FIG. 3A illustrates a cross-sectional view of the force sensing device 300 disposed on the force sensor substrate 200, in accordance with some example embodiments described herein. In general, the force sensing device 300 measures or senses an external force applied to or incident on the force sensing device 300 by transducing the external force to an electrical property such as voltage, current, or both. In some embodiments, the force sensing device 300 may correspond to a microelectromechanical systems (MEMS) force sensing device comprising a micromachined MEMS sensing die fabricated using a silicon wafer and suitable fabrication techniques. In other embodiments, the force sensing device 300 may correspond to a piezoresistive force sensing device comprising a piezoresistive silicon sensing die. As should be understood, the force sensing device 300 is photosensitive. The photosensitivity of the force sensing device 300 is characterized by a known and/or measurable response curve describing and/or indicating wavelengths and/or frequencies of electromagnetic radiation that the force sensing device 300 is sensitive to and a sensitivity describing and/or indicating the minimum and/or maximum intensity of electromagnetic radiation (possibly at a particular wavelength, frequency, and/or wavelength/frequency band) detectable by the force sensing device 300.

In some embodiments, the force sensing device 300 is approximately 1.65 mm×1.65 mm in planar size. In other embodiments, the force sensing device 300 may have other suitable dimensions. In one example embodiment, the force sensing device 300 is 200 microns thick. In another example embodiment, the thickness of the force sensing device 300 may be approximately 300 microns, 400 microns, or any other suitable thickness.

As shown in FIG. 3A, the force sensing device 300 is disposed on the top side 200a of the force sensor substrate 200. The force sensing device 300 is mounted on the top side 200a of the force sensor substrate 200 using the adhesive 10a as shown in FIG. 3A. In some embodiments, the force sensing device 300 comprises sensing elements (not shown) such as piezoresistive sensing components and/or circuitry. The piezoresistive sensing components have an electrical resistance that varies according to the force applied to or incident on the force sensing device 300. In general operation, when the force sensing device 300 is excited through an external voltage, the force applied to or incident on the force sensing device 300 results in a deflection in the electrical resistance of the piezoresistive sensing components. The deflection results in a change in a first output signal of the force sensing device 300, and this change in the first output signal is an indication or measurement of the incident force.

In some embodiments, the piezoresistive sensing components may comprise a silicon piezoresistive material. In other embodiments, the piezoresistive sensing components may comprise non-silicon piezoresistive material. The piezoresistive sensing components may be connected in a Wheatstone bridge configuration or in other similar or dissimilar configuration. It should be appreciated that, the piezoresistive sensing components are only one example of the sensing elements, and it is contemplated that other suitable sensing elements such as, but not limited to, capacitance sensing components may be used.

In various embodiments, the force sensing device 300 may provide a second output signal encoding a light signature of the electromagnetic radiation and/or light incident upon the force sensing device 300. In an example embodiment, the force sensing device 300 may comprise a photosensitive components in addition to the piezoresistive sensing components and/or other mechanically sensitive force sensing components. For example, the force sensing device may comprise a photosensitive layer comprising a photosensitive film and/or the like. The resistance of the photosensitive layer (e.g., the photosensitive film) may change based on electromagnetic radiation incident upon the photosensitive layer. Thus, a change of the resistance of the photosensitive layer (or other photosensitive component of the force sensing device 300) indicates a change in the light signature of the electromagnetic radiation and/or light incident upon the force sensing device 300 and results in a change in a second output signal of the force sensing device 300. This change in the second output signal is an indication or measurement of the electromagnetic radiation and/or light incident upon the force sensing device 300.

In an example embodiment, the force sensing device 300 provides a single output signal that encodes both the applied mechanical force and changes to the electromagnetic radiation and/or light incident upon the force sensing device 300 and/or changes thereto. For example, the resistivity or other parameter of the force sensing device 300 may have different response curves to each of an applied mechanical force and electromagnetic radiation and/or light incident thereon. For example, the time scale of the response curve for the applied mechanical force and the electromagnetic radiation and/or light incident on the force sensing device 300 may differ in a known manner. In another example, the amplitude of the response of the force sensing device 300 may differ for the applied mechanical force and the electromagnetic radiation and/or light incident on the force sensing device 300. For example, the changes to the resistance or other parameter of the force sensing device 300 caused by the electromagnetic radiation and/or light incident on the force sensing device 300 may appear as "noise" (e.g., having an amplitude that is smaller than) the change in the resistance or other parameter of the force sensing device 300 caused by the application of the mechanical force to the force sensing device 300.

In some embodiments, the force sensing device 300 may be disposed on the top side 200a of the force sensor substrate 200 at a position which is off-centered with respect to a center of the force sensor substrate 200 (as shown in FIG. 3A). The off centered position of the disposed force sensing device 300 may provide a visual aid to the users by conveying a configuration of the electrical contact pads, this may help the users while assembling the force sensor package 1 in an application area. In other embodiments, the force sensing device 300 may be disposed at the center of the force sensor substrate 200.

As described above and as shown in FIG. 3A, the force sensing device 300 is mounted on the force sensor substrate 200 using the adhesive 10a. In some embodiments, the adhesive 10a may comprise one or more of silicone, Room-Temperature-Vulcanizing (RTV) silicone, a silicone-epoxy, a soft epoxy, a regular or hard epoxy, or any combination thereof. In one example embodiment, the adhesive 10a may comprise a conductive adhesive. In another example embodiment, the adhesive 10a may comprise a non-conductive adhesive or any combination of the conductive and the non-conductive adhesive. It should be appreciated that, the adhesive 10a is only one example of a suitable bonding mechanism, and it is contemplated that other bonding mechanisms (e.g., but not limited to, solder eutectic, etc.) may be used.

Figure 3B:
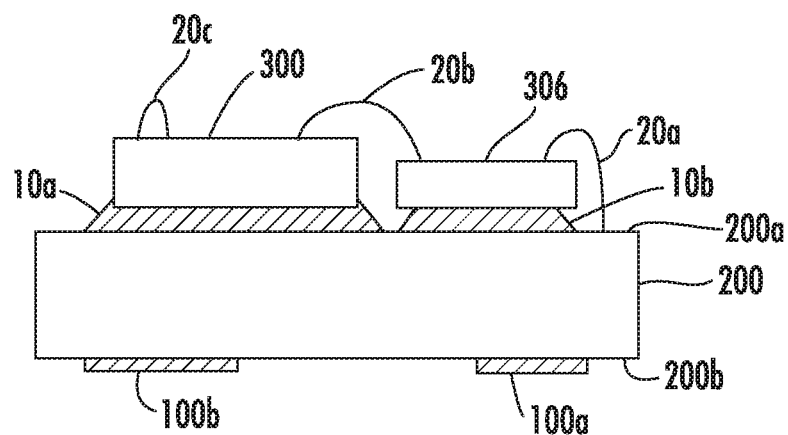
FIG. 3B shows another cross-sectional view of a force sensing device and a signal conditioning circuitry disposed on a force sensor substrate, in accordance with some example embodiments described herein.

Referring now to FIG. 3B, in conjunction with FIG. 3A, another embodiment of the force sensor substrate 200 described above is illustrated. FIG. 3B shows another cross-sectional view of the force sensing device 300 and the optional signal conditioning circuitry 306 disposed on the top side 200a of the force sensor substrate 200, in accordance with some example embodiments described herein. In general, the optional signal conditioning circuitry 306 evens out variations in an input signal (e.g., the first output signal, second output signal, and/or a single output signal provided by the force sensing device 300) to make it suitable for further processing. The variations may arise due to factors such as, but not limited to, temperature variations, external noise, electromagnetic variations, other variations, or combinations thereof.

In some embodiments, the optional signal conditioning circuitry 306 may comprise an application-specific integrated circuit (ASIC), an instrumentation amplifier, a microprocessor, a microcontroller, or a combination thereof. In some embodiments, the optional signal conditioning circuitry 306 may further comprise a digital amplifier with a built-in temperature sensor (not shown) for compensating temperature induced changes caused by the temperature variations. In an example embodiment, the optional signal conditioning circuitry 306 may be configured to separate the effects of a mechanical force applied to the force sensing device 300 and the effects of electromagnetic radiation and/or light incident upon the force sensing device 300 from a single output signal provided by the force sensing device 300 for further processing of each effect. For example, the optional signal conditioning circuitry 306 may separate a single output signal into a first output signal corresponding to the effects of a mechanical force applied to the force sensing device 300 and a second output signal corresponding to the effects of electromagnetic radiation and/or light incident upon the force sensing device 300 for further processing of at least one of the first and second output signals.

In some embodiments, the optional signal conditioning circuitry 306 is approximately 1.97 mm×1.52 mm in planar size. In other embodiments, the optional signal conditioning circuitry 306 may comprise any suitable planar size, such as, but not limited to, approximately 1.94 mm×1.47 mm, 2.00 mm×1.55 mm, or any other suitable planar size. In one example embodiment, the optional signal conditioning circuitry 306 is approximately 0.36 mm thick. In another example embodiment, the thickness of the optional signal conditioning circuitry 306 may be approximately 0.35 mm, 0.36 mm, or any other suitable thickness.

As shown in FIG. 3B, the optional signal conditioning circuitry 306 is mounted on the top side 200a of the force sensor substrate 200 using the adhesive 10b. The optional signal conditioning circuitry 306 is electrically coupled to the force sensing device 300 via one or more wire bonds such as wire bonds (20a, 20b, 20c) as shown in FIG. 3B. The wire bonds (20a, 20b, 20c) may comprise one or more metals, for example, aluminum (Al), copper (Cu), gold (Au) silver (Ag), or a combination thereof. The wire bonds (20a, 20b, 20c) may be wire bonded through suitable wire bonding techniques, for example, thermosonic bonding, ultrasonic bonding, and/or thermocompression bonding techniques. In some embodiments, the wire bonds (20a, 20b, 20c) may have a thickness of approximately 25 microns. In other embodiments, the wire bonds (20a, 20b, 20c) may have any other suitable thickness. It should be appreciated that, the wire bonds (20a, 20b, 20c) is only one example of establishing an electrical connection between the force sensing device 300 and the optional signal conditioning circuitry 306, and it is contemplated that the optional signal conditioning circuitry 306 may be electrically connected to the force sensing device 300 via other ways such as, but not limited to, trace conductors, conductive elastomer preforms, conductive adhesives, anisotropic conductive adhesives, any other suitable connection, or a combination thereof.

As described above, the optional signal conditioning circuitry 306 is electrically connected to the force sensing device 300. In operation, the optional signal conditioning circuitry 306 is configured to receive the first and/or second output signal of the force sensing device 300, the optional signal conditioning circuitry 306 performs conditioning on the received first and/or second output signal and further, provides a conditioned first and/or second output signal for further processing. In some embodiments, the optional signal conditioning circuitry 306 may be disposed on the top side 200a of the force sensor substrate 200 separately from the force sensing device 300. In other embodiments, the optional signal conditioning circuitry 306 may be disposed on the top side 200a of the force sensor substrate 200 as a part of the force sensing device 300.

As described above and as shown in FIG. 3B, the optional signal conditioning circuitry 306 may be mounted on the top side 200a of the force sensor substrate 200 using the adhesive 10b. In some embodiments, the adhesive 10b may comprise one or more of silicone, RTV silicone, a silicone-epoxy, a soft epoxy, a regular or hard epoxy, or any combination thereof. In one example embodiment, the adhesive 10b may comprise a conductive adhesive. In another example embodiment, the adhesive 10b may comprise a non-conductive adhesive or any combination of the conductive and the non-conductive adhesive. It should be appreciated that, the adhesive 10b is only one example of bonding mechanism, and it is contemplated that other bonding mechanism (e.g., but not limited to, solder eutectic, etc.) may be used.

Figure 4A:
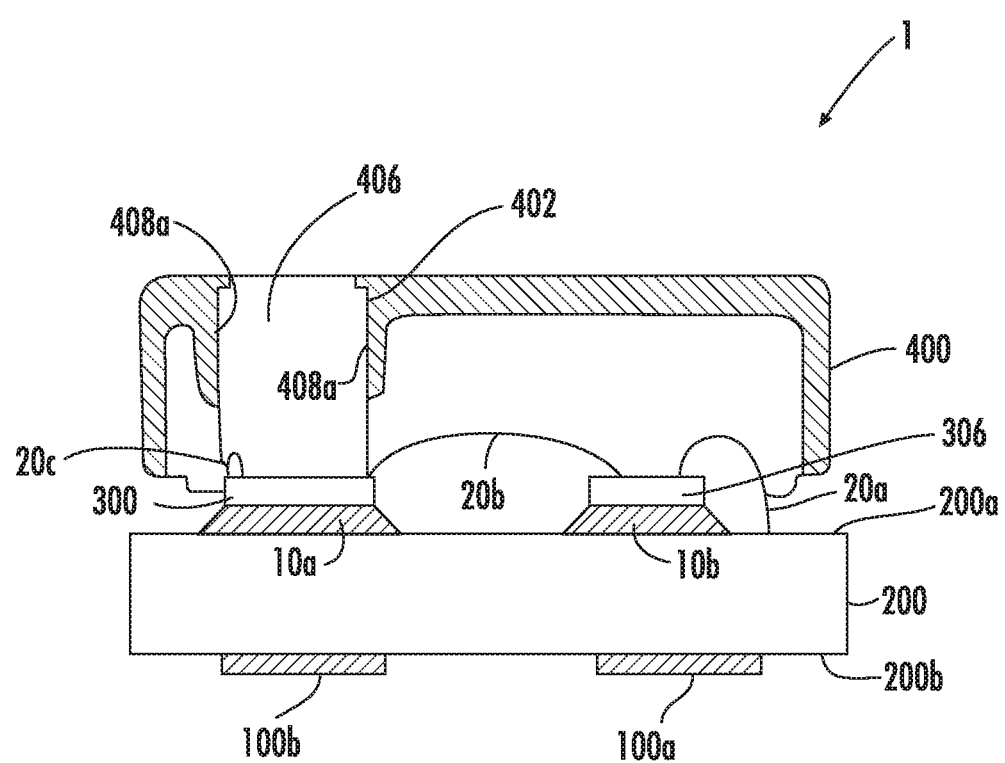
FIG. 4A shows an example embodiment illustrating a cross-sectional view of a housing disposed on a force sensor substrate, in accordance with some example embodiments described herein.
Figure 4B:
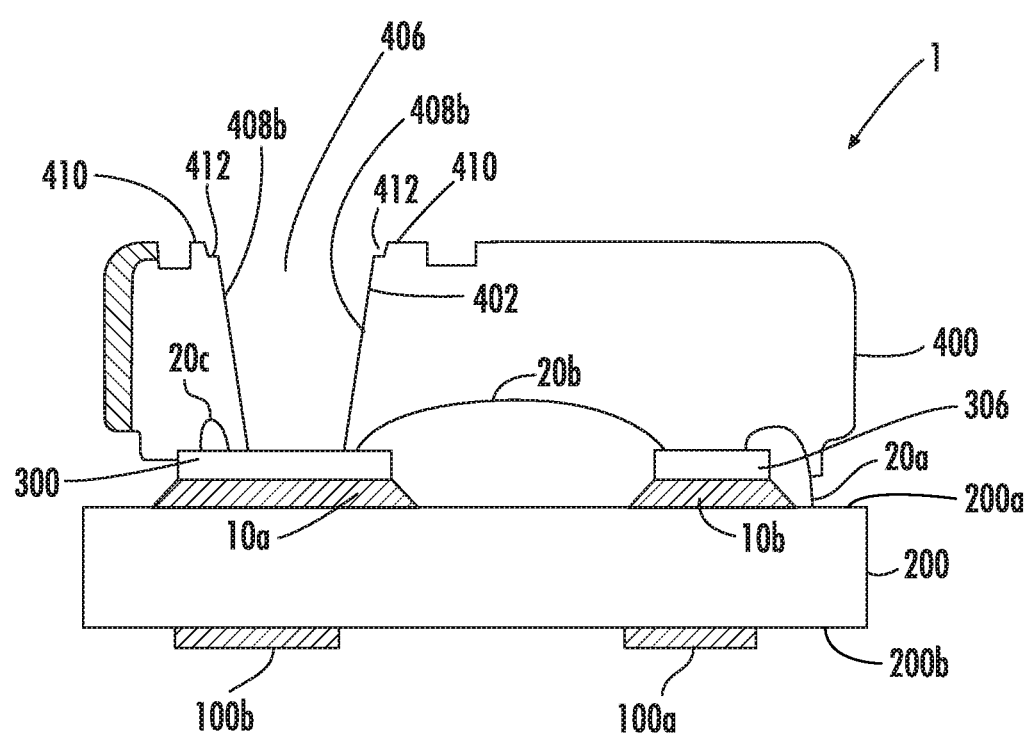
FIG. 4B shows another example embodiment illustrating another cross-sectional view of a housing disposed on a force sensor substrate, in accordance with some example embodiments described herein.

Referring now to FIG. 4A and FIG. 4B, in conjunction with FIGS. 1, 2, and 3, an example embodiment of the housing 400 disposed on the force sensor substrate 200 is described. FIG. 4A shows an example embodiment illustrating a cross-sectional view of the housing 400 disposed on the force sensor substrate 200, in accordance with some example embodiments described herein. FIG. 4B shows another example embodiment illustrating another cross-sectional view of the housing 400 disposed on the force sensor substrate 200, in accordance with some example embodiments described herein.

As shown in FIG. 4A, the housing 400 is disposed on the top side 200a of the force sensor substrate 200. The housing 400 encloses the force sensing device 300 and the optional signal conditioning circuitry 306. The housing 400 further defines the aperture 402. As shown in the FIG. 4A, the aperture 402 is aligned with the force sensing device 300, for example, the center of the aperture 402 may be configured to align with the center of the force sensing device 300. In various embodiments, the aperture 402 is configured to provide a coupling interface 406 disposed therein.

The coupling interface 406 is configured to retain an actuator within the aperture 402. In various embodiments, the actuator may be a translucent or transparent rigid object disposed within the aperture. For example, the actuator may be a glass or translucent polymeric ball or marble, a lens, and/or the like. In an example embodiment, the actuator is (a lens) configured to focus electromagnetic energy and/or light passing there-through onto the force sensing device 300 (and/or a photosensitive layer/film thereof). In general, the actuator provides a light path such that light may pass through the aperture 402 and be incident upon the force sensing device 300 while also acting to apply a mechanical force onto the force sensing device 300 based on a mechanical force applied to the actuator.

As shown in FIG. 4A, the housing 400 may further define a straight interior wall 408a extending from a periphery of the aperture 402, stretching along the length of the housing 400 to the end of the housing 400, in an example embodiment. The cross section of the straight interior wall 408a is a cylindrical shaped cross-section.

In some embodiments, the housing 400 may define a sloping interior wall 408b, as shown in FIG. 4B, in an example embodiment. Referring to FIG. 4B, another embodiment of the housing 400 (explained above in FIG. 4A) is described. FIG. 4B shows another cross-sectional view of the housing 400 disposed on the force sensor substrate 200. As shown in FIG. 4B, the housing 400 defines the sloping interior wall 408b, the sloping interior wall 408b extends from the periphery of the aperture 402, stretching along the length of the housing 400 to the end of the housing 400. The cross-section of the sloping interior wall 408b is a funnel-shaped cross-section. As shown in FIG. 4B, the housing 400 may further define an outer shoulder 410. The outer shoulder 410 has a flat surface which is limited to an outer edge of the periphery of the aperture, followed by a sharp drop-off surface 412 of the outer edge, as shown in FIG. 4B.

In some embodiments, the housing 400 may be a molded plastic component. In other embodiments, the housing 400 may be a stamped metal component or a molded non-plastic component, for example, polyamide, ceramic, any other suitable component, or a combination thereof. In some embodiments, the housing is approximately 4.75 mm×4.25 mm in planar size. In other embodiments, the housing may have any suitable planar size. In one example embodiment, the housing is approximately 1.65 mm thick. In another example embodiment, the housing may have any suitable thickness.

In some embodiments, the aperture 402 defined in the housing 400 may have, for example, a circular, elliptical, oval, or polygonal cross-section. In some embodiments, the aperture 402 may have a cross-sectional radius, such as, but not limited to, approximately 1.44 mm, 1.54 mm, 1.64 mm, or any other suitable radius. In some embodiments, the housing 400 may be attached to the force sensor substrate 200 using a suitable adhesive or any suitable bonding mechanism, for example, solder, eutectic etc.

Figure 5:
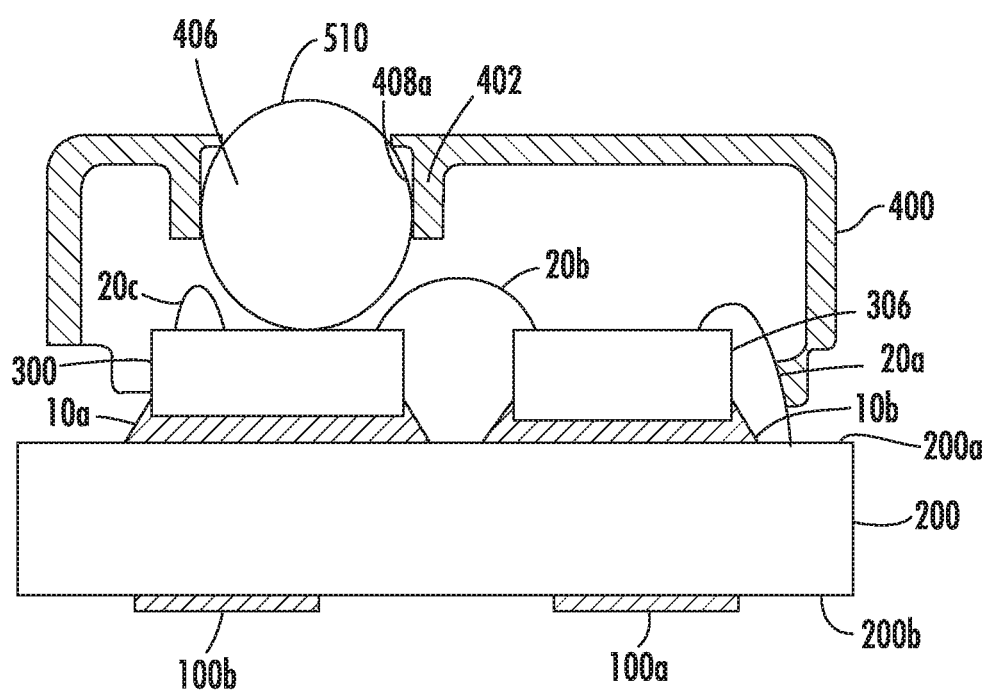
FIG. 5 shows a cross-sectional view of a force sensor package, in accordance with some example embodiments described herein.

Referring now to FIG. 5, in conjunction with FIG. 4A, an example embodiment of a force sensor package 1 is described. FIG. 5 shows a cross-sectional view of the force sensor package 1, in accordance with some example embodiments described herein. As explained earlier, the aperture 402 provides the coupling interface 406 configured to retain an actuator therein. As shown in FIG. 5, a mechanical coupling having an actuator is provided in the coupling interface 406. The coupling interface 406 is configured to retain an actuator within the aperture 402. In various embodiments, the actuator may be a translucent or transparent rigid object disposed within the aperture. For example, the actuator may be a glass or translucent polymeric ball or marble, a lens, and/or the like. In an example embodiment, the actuator is configured to focus electromagnetic energy and/or light passing there-through onto the force sensing device 300 (and/or a photosensitive layer/film thereof). In general, the actuator provides a light path such that light may pass through the aperture 402 and be incident upon the force sensing device 300 while also acting to apply a mechanical force onto the force sensing device 300 based on a mechanical force applied to the actuator.

In an example embodiment, the actuator is a spherical or semi-spherical actuator comprising a clear, translucent, and/or transparent ball 510, as shown in FIG. 5. The ball 510 is mechanically coupled to the force sensing device 300 and is configured to transmit a force to the force sensing device 300 in response to receiving the force from an external source. The ball 510 is disposed in the aperture 402 such that the longitudinal diameter of the ball 510 aligns with a center of the force sensing device 300. The ball 510 is in contact with the interior wall 408a of the housing 400, the contact of the ball 510 with the interior wall 408a allows minimum displacement of the ball 510. A portion of the ball 510 protrudes out through the aperture 402 so that the force from the external source may be concentrated through the ball 510 directly to the force sensing device 300. Moreover, the ball 510 provides a light path for electromagnetic radiation and/or an external source to pass through the ball 510 and be incident upon the force sensing device 300.

In some embodiments, ball 510 may be a glass or polymeric ball. In other embodiments, the ball 510 may be formed from another clear, translucent, and/or transparent material that is rigid (e.g., approximately not compressible by forces of the order of those to be measured by the force sensor package 1). In some embodiments, the ball 510 may have radius in the range of approximately 1.5 mm to 1.6 mm. In other embodiments, the ball 510 may have any suitable radius. The ball 510 is configured to provide high mechanical stability and is adaptable to a variety of applications. It should be appreciated that, the ball 510 is only one example of the actuator, and it is contemplated that other suitable actuators may be used.

Figure 6:
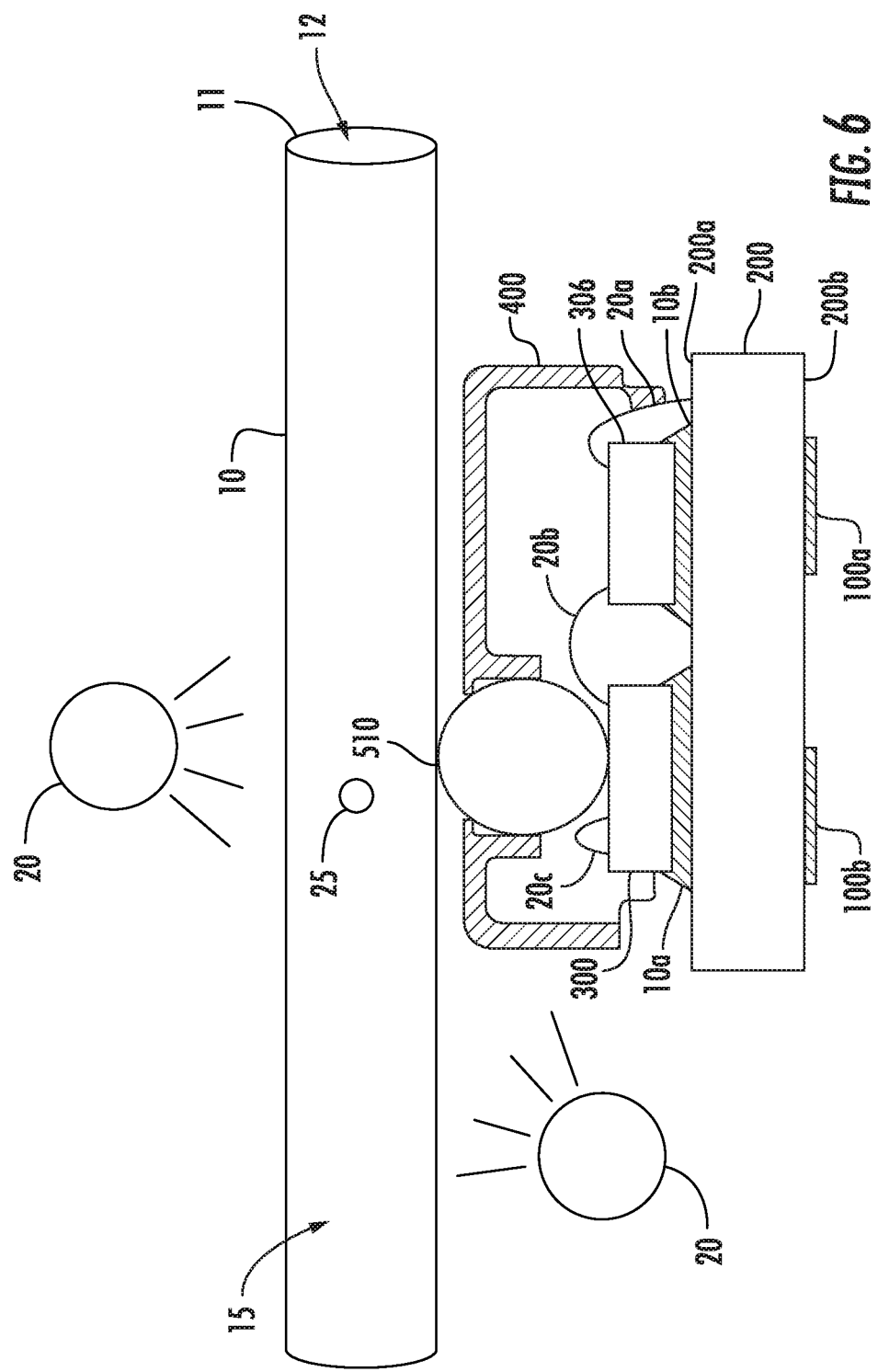
FIG. 6 shows another cross-sectional view of a force sensor package coupled to a tube, in accordance with some example embodiments described herein.

FIG. 6 illustrates an example embodiment of a force sensor package 1 coupled to a tube 10. The tube 10 comprises a tube wall 11 defining an interior, hollow region 12 of the tube 10. Fluid 15 is contained within the tube 10. For example, fluid 15 may be contained within the interior, hollow region 12 of the tube 10. The force sensor package 1 is coupled to the tube 10 such that the fluid 15 contained within the tube 10 may apply a mechanical force on the actuator (e.g., clear, translucent, and/or transparent and rigid ball 510). In an example embodiment, the fluid 15 contained within the tube 10 exerts a mechanical force on the force sensor package 1 through the tube wall 11. In particular, the mechanical force applied to the actuator by the fluid 15 contained within the tube 10 indicates a pressure of the fluid 15 within the tube 10. For example, the tube 10 may be a float line corresponding to a pump such that if there is an occlusion or blockage within the tubing corresponding to the pump, the pressure within the tube 10 will increase. The increase in pressure within the tube 10 will cause the actuator to apply a force to the force sensing device 300 such that the increase in pressure within the tube 10 may be identified and the occlusion and/or blockage within the tubing may be addressed.

In various embodiments, a light source 20 may emit light of a particular wavelength/frequency and/or within a particular wavelength/frequency band into the tube 10 and/or other tubing corresponding to a pump (e.g., a pump for which tube 10 is a float line and/or the like). In an example embodiment, the light source 20 may be disposed directly or approximately directly across the tube 10 (e.g., along an extended diameter of the tube 10) from the actuator (e.g., ball 510) such that at least a portion of the light emitted by the light source 20 is emitted in a direction that is generally towards the actuator. In an example embodiment, the light source 20 may be disposed adjacent or next to the force sensor package 1 such that at least a portion of the light emitted by the light source 20 is emitted generally toward the fluid 15 contained within the tube 10. Reflection and/or refraction of the light by the fluid 15, any bubbles 25, and/or tube wall 11 may cause some of the light emitted by the light source 20 to be incident on the actuator (and travel there through to be incident on the force sensing device 300. In an example embodiment, the light source 20 is a light emitting diode (LED) light source. In various embodiments, more than one light source 20 may be used.

If there are no air bubbles (or other gas bubbles) present in the fluid 15 contained within the tube 10, an expected light signature (e.g., an expected intensity) of the electromagnetic radiation and/or light will reach the force sensing device 300. In an example embodiment, the expected light signature is a predetermined and/or known electromagnetic and/or light signature (e.g., intensity). However, if there are air bubbles 25 (or other gas bubbles) present in the fluid 15 contained within the tube 10, the electromagnetic and/or light signature received by and/or incident upon the force sensing device 300 will differ from the expected light signature (e.g., the received intensity will be greater than or less than the expected intensity). In particular, the absorption coefficient of the air (or other gas) within the bubble(s) 25 differs from the absorption coefficient of the fluid 15 contained within the tube 10. Similarly, the reflective coefficient and/or the refractive index of the air (or other gas) within the bubble(s) 25 differ from the reflective coefficient and/or refractive index of the fluid 15 contained within the tube 10.

Thus, if a bubble 25 is present within the fluid 15 contained within the tube 10, the presence of one or more bubbles in the fluid 15 will change the amount of electromagnetic radiation and/or light that is absorbed, reflected and/or refracted as the electromagnetic radiation and/or light propagates through the fluid 15 contained within the tube 10. This change in absorption, reflection, and/or refraction results in an electromagnetic and/or light signature (e.g., intensity) of electromagnetic radiation and/or light received by and/or being incident on the force sensing device 300 that differs from the expected light signature (e.g., expected intensity). Due to the photosensitivity of the force sensing device 300, this change and/or difference in the received electromagnetic and/or light signature (with respect to the expected light signature) may be detected and the bubbles within the tube 10 may be addressed.

Having described specific components of example devices (e.g., force sensor package 1) that may carry out some functionality of the system described herein, example embodiments of the present disclosure are described below in connection with the flowchart provided by FIG. 7.

Figure 7:
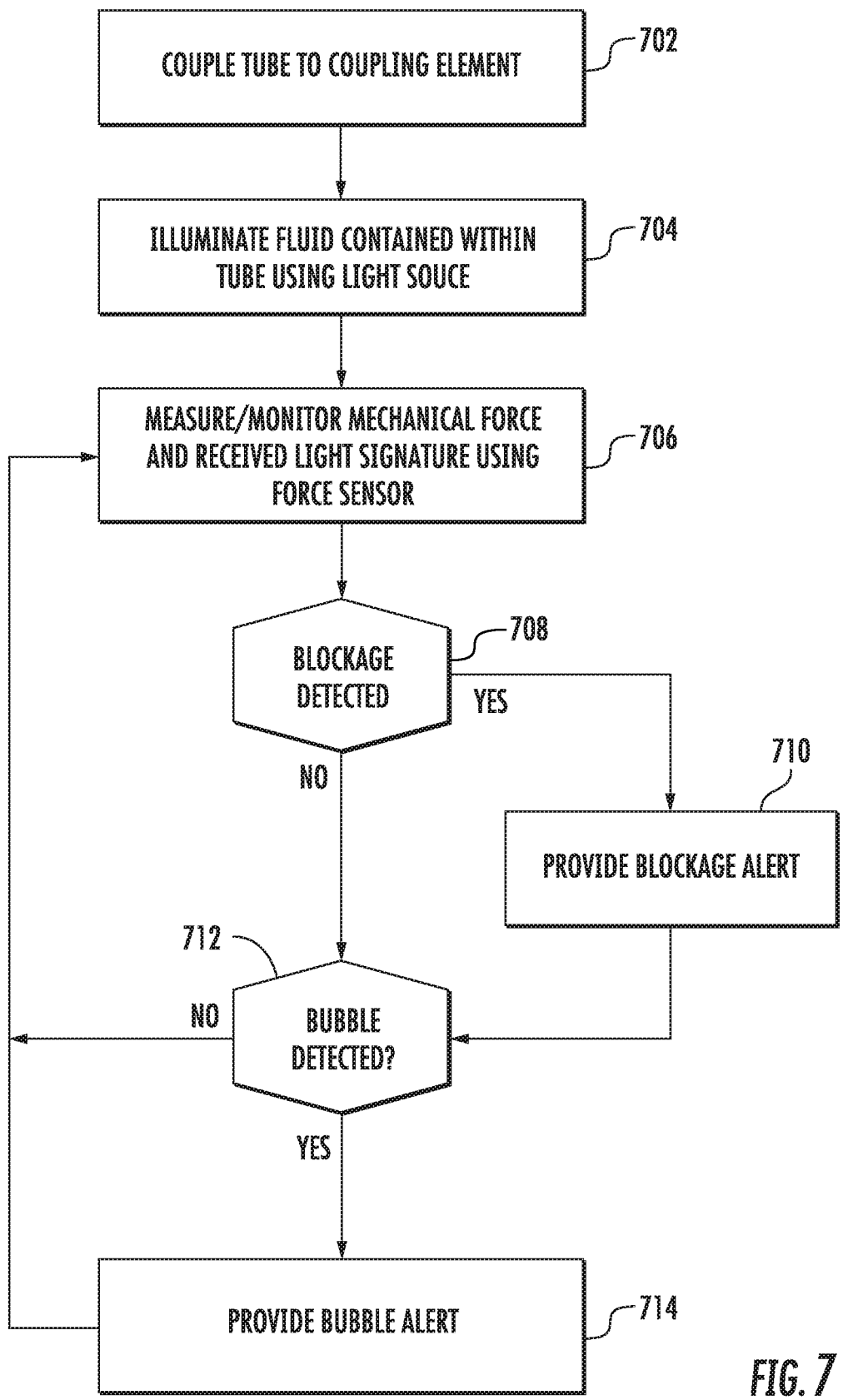
FIG. 7 shows a flowchart illustrating operations for monitoring a tube coupled to the force sensor package for occlusion and/or blockage and bubbles, in accordance with some example embodiments described herein.

Turning to FIG. 7, in conjunction with FIGS. 1-6, a flowchart illustrating operations for using a force sensor package 1 for monitoring a tube 10 for occlusion and/or blockage and (simultaneously and/or contemporaneously) monitoring the tube 10 for the presence of air and/or other gas bubbles in a fluid contained within the tube.

Starting at block 702, the tube 10 is coupled to the coupling interface 406. In an example embodiment, coupling the tube 10 to the coupling interface 406 enables fluid 15 contained within the tube 10 to exert a mechanical force (via the tube wall 11) on the actuator (e.g., ball 510). The actuator may then apply a corresponding mechanical force on the force sensing device 300. In an example embodiment, coupling the tube 10 to the coupling interface 406 enables electromagnetic radiation and/or light propagating through the fluid 15 contained within the tube 10 to pass through the actuator (e.g., clear, translucent, and/or transparent ball 510) and be incident upon the force sensing device 300. For example, in an example embodiment, the tube 10 is a float line corresponding to a pump and has a first end secured to the pump and/or tubing corresponding to the pump and a second end of the tube 10 (which is opposite the first end) with a length of tube defined by the tube wall 11 extending between the first end and the second end. A portion of the tube 10 between the first end and the second end is coupled to the coupling interface 406. For example, a portion of the tube wall 11 may be in physical contact with the actuator (e.g., ball 510) such that the fluid 15 may act via the tube wall 11 to exert a mechanical force on the actuator. As should be understood, the tube wall 11 is made of a flexible material, in an example embodiment.

At block 704, a portion of the tube within the vicinity of the force sensor package 1 is illuminated with a light source 20. For example, the light source 20 may be activated to cause electromagnetic radiation and/or light to be transmitted and/or to propagate through the fluid 15 contained within the tube 10. For example, the light source 20 may be disposed across the tube 10 from the force sensor package 1 such that at least some of the light emitted by the light source 20 is emitted in the direction of a portion of the tube 10 and the force sensor package 1 (e.g., the actuator). In another example, the light source 20 may be disposed generally next to and/or adjacent to the force sensor package 1 such that at least some of the light emitted by the light source 20 is emitted in the direction of the tube 10 such that the light may be reflected and/or refracted by the fluid 15, tube wall 11 and/or any bubbles 25 present within the fluid 15 toward the actuator (e.g., ball 510). For example, the light source 20 may illuminate the fluid 15 and/or tube 10 such that the force sensing device 300 receives (and/or has incident thereon) an electromagnetic and/or light signature (e.g., an intensity of the electromagnetic radiation and/or light incident on the force sensing device 300) corresponding to the fluid 15 within the tube 10 and any bubbles 25 present therein. In an example embodiment, the wavelength/frequency and/or wavelength/frequency band of the electromagnetic radiation and/or light transmitted and/or propagated through the fluid 15 contained within the tube 10 is selected based on a response curve corresponding to the photosensitivity of the force sensing device 300. In an example embodiment, the intensity of the electromagnetic radiation and/or light transmitted and/or propagated through the fluid 15 contained within the tube 10 is selected based on at least one of an expected absorption of the electromagnetic radiation and/or light by the fluid 15 and/or the tube 10 and the sensitivity of the photosensitivity of the force sensing device 300.

At block 706, the mechanical force applied to the force sensing device 300 is measured and/or monitored and the electromagnetic and/or light signature (e.g., intensity) of electromagnetic radiation and/or light (e.g., of a particular wavelength/frequency and/or in a particular wavelength/frequency band) incident on the force sensing device is measured and/or monitored. For example, the optional signal conditioning circuitry 306, one or more controllers, and/or one or more computing entities may receive the first and/or second output signals and/or a single output signal output by the force sensing device 300 and encoding the mechanical force applied to the force sensing device 300 and the electromagnetic and/or light signature received by and/or incident on the force sensing device 300. The first and/or second output signals and/or the single output signal may be processed by the optional signal conditioning circuitry 306, one or more controllers, and/or one or more computing entities to determine a measurement of the applied mechanical force and/or the electromagnetic and/or light signature received by and/or incident on the force sensing device 300, in an example embodiment. The first and/or second output signals and/or the single output signal may be processed by the optional signal conditioning circuitry 306, one or more controllers, and/or one or more computing entities to monitor the first and/or second output signals and/or single output signal to determine and/or identify any changes in the applied mechanical force and/or the electromagnetic and/or light signature received by and/or incident on the force sensing device 300, in an example embodiment.

At block 708, it is determined if an occlusion and/or blockage (or a likely occlusion and/or blockage) within the tube 10 and/or other tubing in fluid communication with the tube 10 is detected. For example, the optional signal conditioning circuitry 306, one or more controllers, and/or one or more computing entities may determine if an occlusion and/or blockage within the tube 10 and/or other tubing in fluid communication with the tube 10 is detected based on processing the first output signal and/or the single output signal. For example, the optional signal conditioning circuitry 306, one or more controllers, and/or one or more computing entities may determine if the mechanical force applied to the force sensing device 300 by the fluid 15 contained within the tube 10 (e.g., via the actuator) satisfies a mechanical force threshold requirement. For example, if the mechanical force applied to the force sensing device 300 by the fluid 15 contained within the tube 10 (e.g., via the actuator) satisfies a first mechanical force threshold requirement (e.g., is greater than a mechanical force threshold), it may be determined that an occlusion and/or blockage has been detected. In an example embodiment, the optional signal conditioning circuitry 306, one or more controllers, and/or one or more computing entities may determine if a change in the mechanical force applied to the force sensing device 300 by the fluid 15 contained within the tube 10 (e.g., via the actuator) over a predefined time period satisfies a second mechanical force threshold requirement. For example, if the mechanical force applied to the force sensing device 300 by the fluid 15 contained within the tube 10 (e.g., via the actuator) changes by more than a changed mechanical force threshold over a predefined time period, it may be determined that an occlusion and/or blockage has been detected.

If, at block 708, it is determined that an occlusion and/or blockage (or a likely occlusion and/or blockage) has been detected, the process continues to block 710. At block 710, a blockage alert, notification, and/or warning is provided. For example, the optional signal conditioning circuitry 306, one or more controllers, and/or one or more computing entities may cause a display to visually display a blockage alert, notification, and/or warning; cause a warning light to be activated, flash, and/or the like; cause a speaker to audibly provide a blockage alert, notification, and/or warning, transmit a blockage alert, notification, and/or warning via one or more wired or wireless networks or direct communication (e.g., via Bluetooth and/or the like) to an electronic address (e.g., email, instant message, text message, alert system located at a nurse's desk, and/or the like) and/or a computing entity. In an example embodiment, the blockage alert, notification, and/or warning provides an indication of the identified and/or determined occlusion and/or blockage. The occlusion and/or blockage of the tube 10 may then be addressed by a user, healthcare worker, and/or the like in response to the provision of the blockage alert, notification, and/or warning. The process then proceeds to block 712.

If at block 708, it is determined that an occlusion and/or blockage (or a likely occlusion and/or blockage) has not been detected, the process continues to block 712.

At block 712, it is determined if air bubble(s) 25 (and/or other gas bubbles) have been detected within the fluid 15 contained within the tube 10 and/or other tubing in fluid communication with the tube 10 (or that it is likely there are bubbles 25 within the fluid 15). For example, the optional signal conditioning circuitry 306, one or more controllers, and/or one or more computing entities may determine if air bubbles 25 (and/or other gas bubbles) within the fluid 15 contained within the tube 10 and/or other tubing in fluid communication with the tube 10 are detected based on processing the second output signal and/or the single output signal. For example, the optional signal conditioning circuitry 306, one or more controllers, and/or one or more computing entities may determine if electromagnetic and/or light signature received by and/or incident on the force sensing device 300 satisfies a light signature threshold requirement and/or is in agreement with an expected light signature. For example, if the difference between an expected light signature and the electromagnetic and/or light signature received by and/or incident on the sensing device 300 satisfies a first light signature threshold requirement (e.g., is greater than a light signature threshold), it may be determined that air bubbles 25 (or other gas bubbles) have been detected. In an example embodiment, the optional signal conditioning circuitry 306, one or more controllers, and/or one or more computing entities may determine if a change in electromagnetic and/or light signature received by and/or incident on the force sensing device 300 over a predefined time period satisfies a second light signature threshold requirement. For example, if the electromagnetic and/or light signature received by and/or incident on the force sensing device 300 changes by more than a changed light signature threshold over a predefined time period, it may be determined that bubbles 25 within the fluid 15 contained within the tube 10 have been detected. For example, the expected light signature may be determined as a baseline electromagnetic and/or light signature received by and/or incident on the force sensing device 300 at a time when a user can confirm that no bubbles are present in the fluid 15 contained within the tube 10, at the initiation of the processing of the second output signal and/or single output signal and/or the like such that the expected light signature may be determined for the particular tube 10, pump corresponding to the tube 10, other tubing corresponding to the pump; ambient lighting in the vicinity of the force sensor package 1, the tube 10, and/or other components corresponding thereto; and/or the like.

If, at block 712, it is determined that bubbles have been detected in the fluid 15 contained within the tube 10 (and/or that it is likely there are bubbles within the fluid 15), the process continues to block 714. At block 714, a bubble alert, notification, and/or warning is provided. For example, the optional signal conditioning circuitry 306, one or more controllers, and/or one or more computing entities may cause a display to visually display a bubble alert, notification, and/or warning; cause a warning light to be activated, flash, and/or the like; cause a speaker to audibly provide a bubble alert, notification, and/or warning; transmit a bubble alert, notification, and/or warning via one or more wired or wireless networks or direct communication (e.g., via Bluetooth and/or the like) to an electronic address (e.g., email, instant message, text message, alert system located at a nurse's desk, and/or the like) and/or a computing entity. In an example embodiment, the bubble alert, notification, and/or warning provides an indication of the identified and/or determined presence of bubbles 25 within the fluid 15 contained within the tube 10. The bubbles 25 within the fluid 15 contained within the tube 10 may then be addressed by a user, healthcare worker, and/or the like in response to the provision of the bubble alert, notification, and/or warning. The process may then return to block 706, in an example embodiment.

If at block 712, it is determined that bubbles have not been detected within the fluid 15 (or that bubbles are likely not present in the fluid 15), the process returns to block 706.

As described above, example embodiments of the present disclosure thus provide a force sensor package which provides a coupling interface that provides a path for the application of a mechanical force to a force sensing device 300 and/or a light path such that electromagnetic radiation and/or light transmitted and/or propagating through fluid 15 contained within a tube 10 coupled to the coupling interface may be incident upon the force sensing device 300. Thus, various embodiments provide a single sensor (e.g., force sensor package 1) that may be used to monitor a tube for occlusion and/or blockage and monitor the tube for bubbles present in a fluid contained within the tube. Moreover, the miniature size of the force sensor package 1 allows for the monitoring of a tube for occlusion and/or blockage and bubbles in small application areas and/or while reducing the amount of space within the application area taken up by sensors.

Accordingly, the described flowchart blocks support combinations of means for performing the specified functions and combinations of operations for performing the specified functions. It will also be understood that one or more flowchart blocks, and combinations of flowchart blocks, can be implemented by special purpose hardware-based computer systems which perform the specified functions, or combinations of special purpose hardware that execute computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," and similar words are not intended to limit the order of the steps; these words are simply used to guide the reader through the description of the methods. Further, any reference to claim elements in the singular, for example, using the articles "a," "an" or "the," is not to be construed as limiting the element to the singular and may, in some instances, be construed in the plural.

The hardware used to implement the various illustrative logics, logical blocks, modules, and circuits described in connection with the aspects disclosed herein may comprise a general-purpose processor, a digital signal processor (DSP), a special-purpose processor such as an ASIC or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function. For example, a computing entity of an example embodiment comprises at least one processor or microprocessor, at least one non-transitory computer-readable memory (e.g., volatile and/or non-volatile memory), and at least one of (a) a communications interface configured to communicate via one or more wired and/or wireless networks (e.g., Wi-Fi) and/or via direct communication (e.g., Bluetooth) or (b) a user interface configured to at least provide output to a user via an output device (e.g., display, warning light, speaker, and/or the like).

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may comprise RAM, ROM, EEPROM, FLASH memory, disk storage, magnetic storage devices, or the like. Disk storage, as used herein, comprises compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the disclosure set forth herein will come to mind to one skilled in the art to which this disclosure pertains having the benefit of teachings presented in the foregoing descriptions and the associated drawings. Although the figures only show certain components of the apparatus and systems described herein, it is understood that various other components may be used in conjunction with the supply management system. Therefore, it is to be understood that the disclosure is not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A photosensitive force sensor comprising:
a force sensing device configured to be disposed on a surface of a substrate;
a housing configured to be disposed on at least a portion of the surface of the substrate, wherein the housing is configured to enclose the force sensing device, and wherein the housing defines an aperture configured to provide a coupling interface; and
an actuator configured to be disposed partially within the housing and partially within the aperture,
wherein the actuator is (a) in mechanical contact with the force sensing device, (b) a rigid body, (c) and configured to provide a light path from a light source external to the housing to the force sensing device.

2. The photosensitive force sensor of claim 1, wherein the force sensing device is photosensitive.

3. The photosensitive force sensor of claim 1, wherein the force sensing device comprises at least one of a piezoresistive force sensing device and a microelectromechanical systems (MEMS) force sensing device.

4. The photosensitive force sensor of claim 1, wherein a center of the aperture is configured to align with a center of the force sensing device.

5. The photosensitive force sensor of claim 1, wherein the actuator is (a) translucent or at least partially transparent and (b) at least one of (i) an at least semi-spherical ball or (ii) a lens.

6. The photosensitive force sensor of claim 1, wherein the force sensing device is configured to provide at least one output signal indicating (a) a mechanical force applied to the force sensing device and (b) a light signature incident upon the force sensing device.

7. A system for monitoring a tube for blockage and for the presence of bubbles within a fluid contained within the tube, the system comprising:
a force sensing device configured to be disposed on a surface of a substrate;
a housing configured to be disposed on at least a portion of the surface of the substrate, wherein the housing is configured to enclose the force sensing device, and wherein the housing defines an aperture configured to provide a coupling interface, the coupling interface configured to be coupled a portion of a tube wall of the tube;
an actuator configured to be disposed partially within the housing and partially within the aperture; and
a light source configured to illuminate the fluid contained within the tube,
wherein the actuator is (a) in mechanical contact with the force sensing device, (b) a rigid body, (c) and configured to provide a light path from the fluid contained within the tube to the force sensing device.

8. The system of claim 7, wherein the force sensing device is photosensitive.

9. The system of claim 7, wherein the force sensing device comprises at least one of a piezoresistive force sensing device and a microelectromechanical systems (MEMS) force sensing device.

10. The system of claim 7, wherein a center of the aperture is configured to align with a center of the force sensing device.

11. The system of claim 7, wherein the actuator is (a) translucent or at least partially transparent and (b) at least one of (i) an at least semi-spherical ball or (ii) a lens.

12. The system of claim 7, wherein the tube is a float line coupled to a pump.

13. The system of claim 7, wherein the force sensing device is configured to provide at least one output signal indicating (a) a mechanical force applied to the force sensing device and (b) a light signature incident upon the force sensing device.

14. A method for monitoring fluid contained within a tube for the presence of bubbles, the method comprising:
processing an output signal of a force sensing device to determine whether the output signal satisfies a light signature threshold requirement,
wherein the force sensing device is an element of a force sensor package comprising:
the force sensing device configured to be disposed on a surface of a substrate;
a housing configured to be disposed on at least a portion of the surface of the substrate, wherein the housing is configured to enclose the force sensing device, and wherein the housing defines an aperture configured to provide a coupling interface; and
an actuator configured to be disposed partially within the housing and partially within the aperture,
wherein the actuator is (a) in mechanical contact with the force sensing device, (b) a rigid body, (c) and configured to provide a light path from a light source external to the housing to the force sensing device.

15. The method of claim 14, wherein (a) a portion of the tube is coupled to the coupling interface, (b) a light source illuminates the fluid contained within the tube, and (c) the light source external to the housing comprises the light source.

16. The method of claim 14 further comprising, responsive to determining that the output signal satisfies the light signature threshold requirement causing a bubble alert to be provided.

17. The method of claim 14 further comprising processing the output signal or a first output signal to determine whether a mechanical force applied to the force sensing device satisfies a mechanical force threshold requirement.

18. The method of claim 17 further comprising responsive to determining that the output signal or the first output signal satisfies the mechanical force threshold requirement causing a blockage alert to be provided.

19. The method of claim 14, wherein (a) the force sensor package further comprises a signal conditioning circuitry configured to be electrically coupled to the force sensing device, (b) the housing is further configured to enclose the signal conditioning circuitry, and (c) the processing of the at least one output signal is performed at least in part by the signal conditioning circuitry.

20. The method of claim 14, wherein the actuator is (a) translucent or at least partially transparent and (b) at least one of (i) an at least semi-spherical ball or (ii) a lens.

* * * * *